May 29, 1956     J. RONDELLO     2,747,319
FISHING CASTING FLOAT PLATE
Filed April 2, 1954
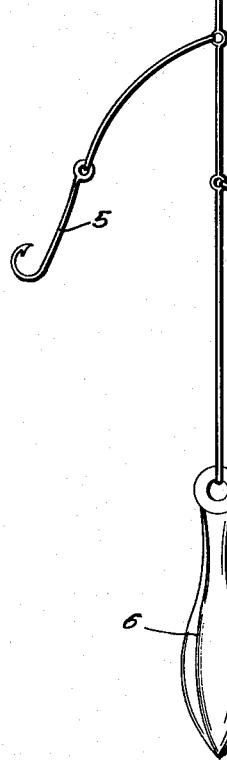
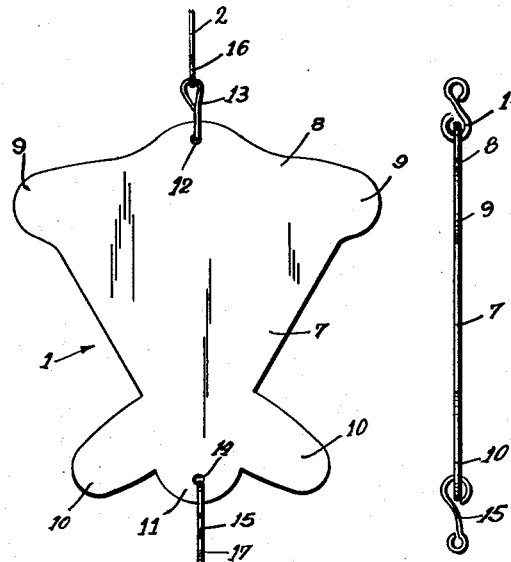
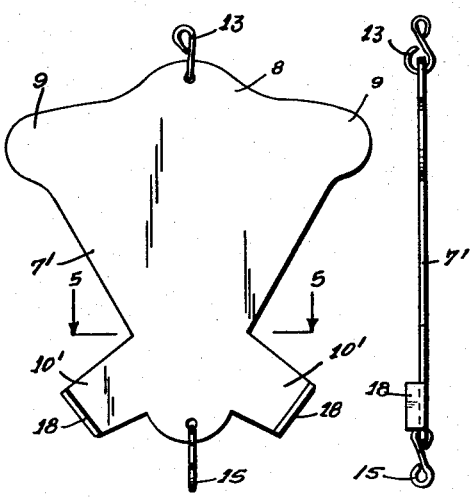
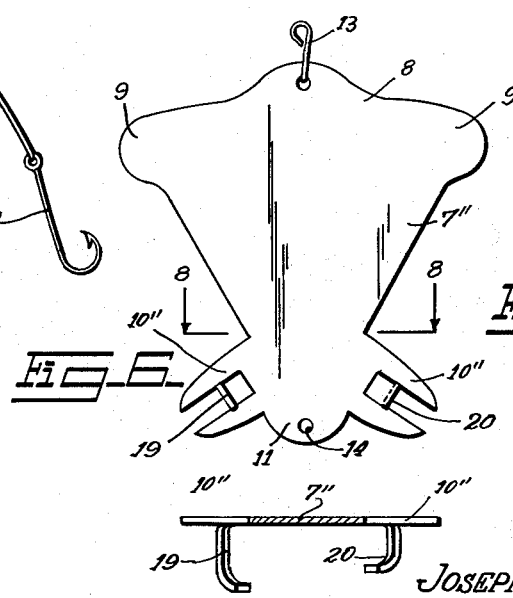
INVENTOR.
JOSEPH RONDELLO
BY
ATTORNEY

United States Patent Office 2,747,319
Patented May 29, 1956

2,747,319

FISHING CASTING FLOAT PLATE

Joseph Rondello, Bronx, N. Y.

Application April 2, 1954, Serial No. 420,604

2 Claims. (Cl. 43—43.13)

This invention relates to fishing lines and, more particularly, to new and useful improvements in a casting float for use with a fishing line.

A principal object of the present invention is to provide a casting float for a fishing line constructed so as to prevent entanglement or fouling of the line with obstructions under the water.

Another object of the invention is to provide a casting float so shaped and positioned relative to the hooks and sinker that the initial jerk on the line when reeling in will cause the hooks and sinker to move upwardly thereby facilitating reeling in of the line.

A further object of the invention is to provide a casting float so shaped and so positioned relative to the hooks and sinker that the line, hooks and sinker are prevented from floating under obstructions under the water.

Yet another object of the invention is to provide a casting float which will remain on the line and still permit the sinker and hooks at the end of the line to be reeled in close to the end of the fishing rod and which does not either materially drag on the line or interfere with the movement of the line.

It is a further object of the invention to provide a casting float for a fishing line which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of a casting float embodying one form of the invention in operative position on a fishing line.

Fig. 2 is an edge view thereof.

Fig. 3 is a view similar to Fig. 1 showing a modified form of the invention.

Fig. 4 is an edge view thereof.

Fig. 5 is a cross sectional view taken on the plane of the line 5—5 of Fig. 3.

Fig. 6 is a view similar to Fig. 1 but showing a further modification of the invention.

Fig. 7 is an edge view thereof.

Fig. 8 is a cross sectional view taken on the plane of the line 8—8 of Fig. 6.

Referring to the first form of the invention shown in Figs. 1 and 2, the reference character 1 indicates a casting float which is secured at one end to the end of a conventional fishing line 2 and secured at its other end to a short section 3 of the fishing line, which section mounts the fish hooks 4 and 5 and the sinker 6, close to the float.

The float comprises an elongated flat metal plate 7 of substantially symmetrical shape, with the wide portion 8 thereof formed with laterally protruding wings 9 having curved outer edges. The narrow portion of the plate is formed with wings 10, extending at an angle to a line through the longitudinal center of the plate, and is formed with a curved extension 11 between the wings 10. The outer edges of wings 10 are curved. A flat, smooth and symmetrical plate body is thus provided. The wide portion 8 of the plate is formed with an opening 12, at its center, and adjacent the edge thereof for hingedly receiving an S-shaped hook 13. A similar opening 14 is formed in the narrow end of the plate at its center for hingedly receiving an S-shaped hook 15. The end of the fishing line 2 is fastened to the wide end of the plate by a loop 16 on the line tied to the hook 13. The narrow end of the plate is attached to the short section 3 of the fishing line by a loop 17 formed on said section and tied to the hook 15. The plate is thus positioned close to the fish hooks and sinker.

In use, the shape of the float and its weight added to the weight of the sinker make it easier to throw out the line in casting. When the sinker strikes the bed of the water, the float will assume a horizontal position and will come to a state of equilibrium on any obstruction such as a rock or root or the like near the hooks thereby preventing the hooks and the adjacent portion of the line from becoming entangled in such obstructions. Upon reeling in the line, in shallow water, the initial pull on the line will jerk the float upwardly so that the hooks will be held a little higher from the bed of the water than was the case at the time the hooks settled as the float first came to rest in the water. Consequently, the hooks are held up high enough to cause the danger of fouling or of losing the hooks, leader and/or sinker, during reeling in of the line, to be reduced to a minimum.

In the modified form of casting float shown in Figs. 3, 4 and 5, the wings 10' at the narrow end of the plate 7' are bent laterally to form slightly curved flanges 18. These flanges cause the float to move in an irregular fashion when the float is being pulled through the water so that the hooks are not likely to cling to any obstruction.

In all other respects, the form of the invention shown in Figs. 3, 4 and 5 is similar to the form shown in Figs. 1 and 2 and similar reference numerals are used to indicate similar parts.

Figs. 6, 7 and 8 illustrate a further modification of the invention wherein the wings 10'' at the narrow end of the plate 7'' are provided with outstruck portions forming curved flanges 19 and 20. The flange 19 is longer than the flange 20 so that a more eccentric action is provided than is the case with the form of Figs. 3, 4 and 5, when the float is being pulled through the water thereby minimizing the chance of the hooks catching in any obstruction.

In all other respects, the form of the invention shown in Figs. 6, 7 and 8 is similar to the form shown in Figs. 1 and 2, and similar reference numerals are used to indicate similar parts.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A casting float for a fishing line comprising a flat metal elongated body, substantially symmetrical in shape and of different widths at its ends, opposed slanting wings at the smaller end of the body, opposed laterally extending wings on the wide end of the body, and S-shaped hook members hingedly connected to both ends of the body for attachment to a fishing line, said slanting wings being provided with outstruck curved flanges for causing wabbling of the body when being pulled through the water.

2. A casting float for a fishing line comprising a flat metal elongated body, substantially symmetrical in shape and of different widths at its ends, opposed slanting wings at the smaller end of the body, opposed laterally extending wings on the wide end of the body, and S-shaped hook members hingedly connected to both ends of the body for attachment of a fishing line, said slanting wings being provided with outstruck curved flanges for causing wabbling of the body when being pulled through the water, one of said outstruck flanges being longer than the other.

References Cited in the file of this patent
UNITED STATES PATENTS

| | | |
|---|---|---|
| 1,123,717 | Frey | Jan. 5, 1915 |
| 1,558,249 | DeZeng | Oct. 20, 1925 |
| 1,738,617 | Scharrer | Dec. 10, 1929 |
| 2,319,026 | Adam | May 11, 1943 |
| 2,639,537 | Wagner | May 26, 1953 |